June 6, 1967  A. ARIAS  3,323,356
APPARATUS FOR POSITIONING AND LOADING A TEST SPECIMEN
Filed July 7, 1964  3 Sheets-Sheet 1

INVENTORS
ALAN ARIAS
ATTORNEYS

INVENTOR.
ALAN ARIAS

June 6, 1967　　　　　A. ARIAS　　　　　3,323,356
APPARATUS FOR POSITIONING AND LOADING A TEST SPECIMEN
Filed July 7, 1964　　　　　　　　　　　3 Sheets-Sheet 3

*INVENTOR.*
ALAN ARIAS

BY

ATTORNEYS

United States Patent Office 3,323,356
Patented June 6, 1967

3,323,356
APPARATUS FOR POSITIONING AND LOADING A TEST SPECIMEN
Alan Arias, Cleveland, Ohio, assignor to the United States of America as represented by the Administrator of the National Aeronautics and Space Administration
Filed July 7, 1964, Ser. No. 380,960
3 Claims. (Cl. 73—100)

The invention described herein may be manufactured and used by or for the Government of the United States of America for Governmental purposes without the payment of any royalties thereon or therefor.

The present invention relates to apparatus for testing materials and, more particularly, to apparatus for testing by bending at high temperatures and in a vacuum or inert atmosphere, metallic and non-metallic solid materials. The tests are performed by subjecting the specimen to three or four point loading.

The modulus of rupture of flexural strength for a prismatic bar of material with freely supported ends is defined by the equation $$S = \tfrac{3}{2} PL/bh^2$$

where S is the modulus of rupture in units of force per unit area, P is the force at rupture applied to the beam or rod at midspan, L is the moment arm, $b$ is the width of the beam, and $h$ is the height of the beam. Similar equations for other cross-sections are well known to one skilled in this art.

The modulus of rupture is a useful criterion for comparison of the relative strengths of brittle materials up to temperatures at which the materials deform plastically. Oxides, carbides, borides, and many other ceramic type materials are commonly tested in this manner. The ease with which the test specimens can be prepared, the speed with which the test can be carried out, and the relative simplicity of the test equipment for room temperature testing, among other factors, account for the popularity of this testing method. High temperature testing for the modulus of rupture has, in common with other testing procedures, the disadvantage that time is required for heating and cooling the furnace as well as for loading and unloading the test specimens.

The modulus of elasticity in tension of a beam or rod is defined by the equation $$\delta s = PL^3/48 E_s I_s$$

where $E_s$ equals Young's modulus of elasticity in p.s.i., $\delta s$ is the deflection at midspan in inches, L is the span between the support rods, $I$ is the moment of inertia of the cross-section of the beam of bar stock, and P is the load in pounds required to produce the deflection. Similar equations for other types of loading are well known in this art.

The general purpose of this invention is to provide for a testing apparatus from which can be determined either the modulus of elasticity or the modulus of rupture of a specimen.

An object of the present invention is to provide for a new and improved apparatus for measuring or determining the modulus of elasticity.

Another object is to provide for a new and improved apparatus for measuring or determining the modulus of rupture.

A further object of this invention is to provide for an apparatus for performing the above-mentioned tests in a vacuum or inert atmosphere.

Another object of this invention is to provide for an apparatus for performing the above-mentioned tests at a high temperature.

Yet, still another object of this invention is to provide for a new and improved apparatus for performing the above-mentioned test at high temperatures and at which a large number of specimens can be tested in the same run without opening the heating furnace in which the test apparatus is contained.

Yet, still another purpose of this invention is to provide for a new and improved apparatus for performing the above-mentioned test at a high temperature wherein successive pieces can be tested without necessitating the heating and cooling of the heating element.

Another object of this invention is to provide for a more accurate means of measuring the modulus of rupture or modulus of elasticity.

A still further object of this invention is to provide for a new and improved way of holding a plurality of test pieces on a modulus of ruptured testing device.

Another object of this invention is to provide for a material test device in which the temperature can be more accurately measured.

A still further object of this invention is to provide for an improved furnace on which is mounted a modulus of rupture or a modulus of elasticity testing device.

Still another object of this invention is to provide for a device for determining the plastic deformation in bending at any temperature of a solid material.

Yet still another object of this invention is to provide for a new and improved modulus of elasticity or modulus of rupture testing device in which the test specimens can be interchanged or removed while the testing device is mounted within the furnace.

Still another object of this invention is to provide for a new and improved testing device for use in a heating chamber wherein heat losses in the device and chamber are greatly reduced.

Other objects and many of the attendant advantages of this invention will be readily appreciated as the same becomes better understood by reference to the following detailed description when considered in connection with accompanying drawings in which like reference numerals designate like parts throughout the figures thereof and wherein.

Figure 1:
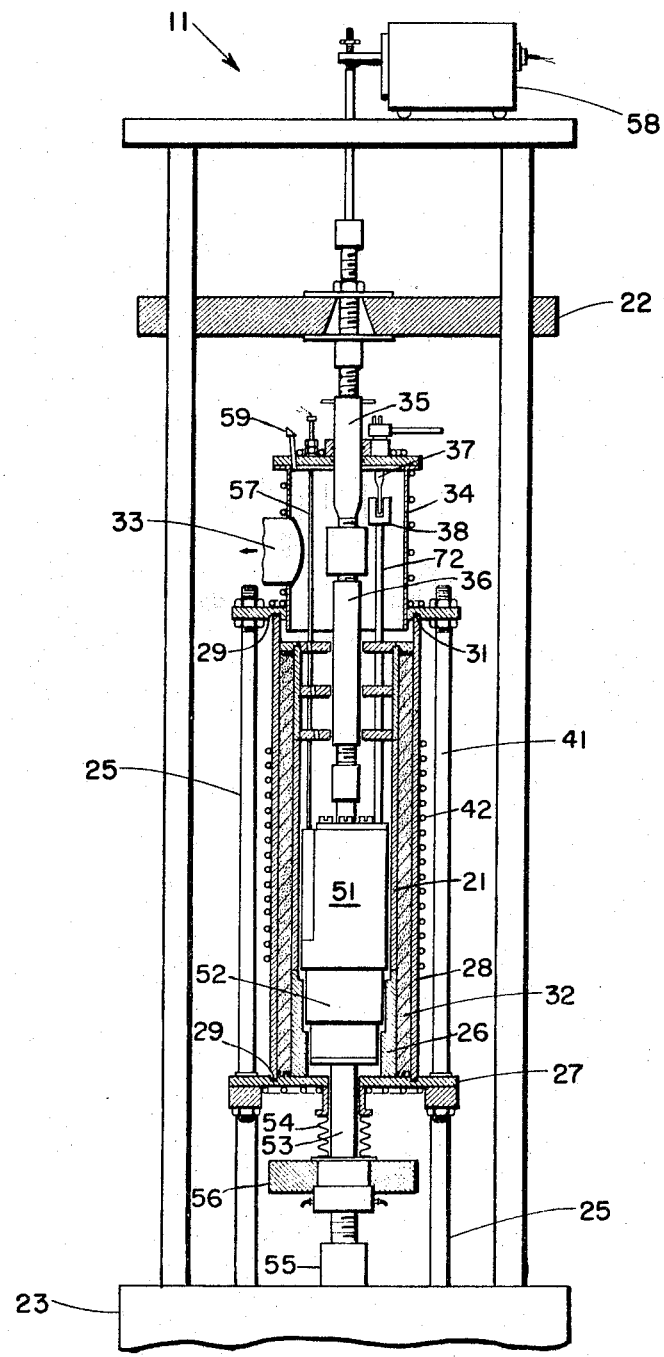
FIG. 1 is a diagramatic view of the furnace portion of the apparatus including a modulus of rupture testing device mounted thereon.

Referring now to the drawings wherein like reference characters designate like or corresponding parts throughout the several views, there is shown in FIG. 1 a high temperature vacuum furnace generally referred to as reference number 11. As shown in FIG. 1, the high temperature vacuum furnace or heating element is induction heated by a graphite susceptor 21. The furnace is mounted between cross head 22 and a base plate 23. The furnace 11 is supported by four legs 25 of adjustable height which are bolted to the base plate. To reduce heat losses, the furnace is further provided with carbon susceptor extensions 26. These extensions reduce heat losses because of the low thermal and electrical conductivity of carbon compared with that of graphite. The graphite susceptor 21 and the carbon extension 26 rest on a water cooled bottom plate 27 and are kept in position by means of pins (which are not shown). The susceptor 21 is located inside a fused silica tube 28 which fits into annular grooves 29 in the water-cooled top and bottom plates. Silicon rubber gaskets 31 which are positioned in these grooves seal the heating chamber airtight. Carbon black insulation 32 fills the annular space between the susceptor assembly and the silica tube. Glass or graphite cloth backed by a segmented graphite ring prevents the carbon black insulation from being blown out during evacuation of the furnace. The furnace connects to a vacuum system through a port 33 in a water cooled manifold 34 that is welded to the top plate. Four thick tie rods 41 between the bottom and top plates align the furnace and insure a rigid assembly. Power is provided trough a water-cooled induction coil 42 which is wrapped around the silica tube. The test portion 51 of the device rests on a carbon block insulator 52 which in turn rests on the water cooled bottom plunger 53. A Teflon bellows assembly 54 located between the bottom plunger and the bottom plate provides vacuum tightness without appreciable effect on the vertical motions of the bottom plunger and prevents it from rotating. A threaded collar 55 allows vertical adjustments of the bottom plunger. A lead counter weight 56 balances the atmospheric pressure on the plunger when the furnace is under vacuum.

The force required to break the test specimen is transmitted from the crosshead 22 to the tester through a water-cooled top plunger 35 and a carbon rod 36. Couplings between the top plunger and the carbon rod and between the carbon rod and the tester complete the force-transmitting link. The flat lower portion of an actuator 37 fits loosely into a slot in an adapter 38, which is attached to an actuator extension rod 72. The actuator assembly allows transmission of rotational motion to the tester without interfering with its vertical motions.

A thermocouple tube 57 extends inside the testing element 51 to determine the specimen temperatures; temperatures can also be determined by sighting through a prism 59 in the furnace cover and a sighting hole 102 in the housing of the test device. Cross head motions are sensed by a deflectometer 58 connected to the top of the plunger through an adjustable length link. In addition to its use in connection with rupture testing and elasticity testing, the furnace may also be used as a hot press, a tensile tester, or a compression tester.

Figure 2:
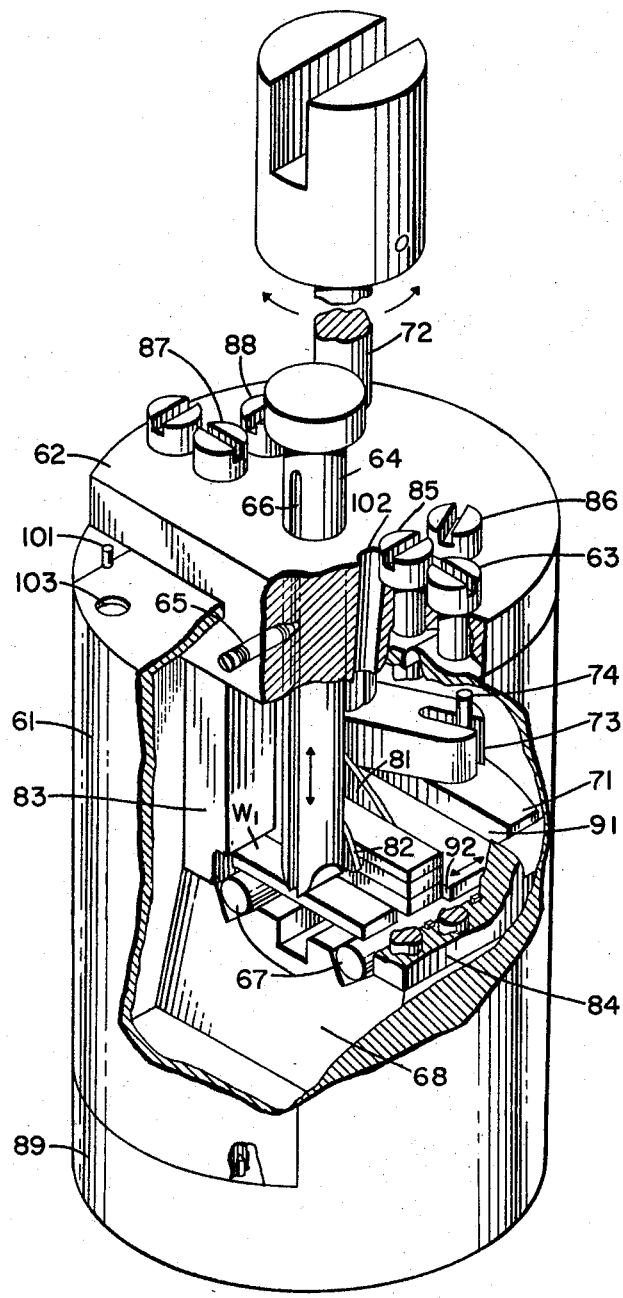
FIG. 2 is a pictorial view partly in section and partly broken away of the modulus of rupture testing portion of the apparatus.

Referring now to FIG. 2 there is shown a modulus of rupture testing device which can be used in conjunction with the furnace or heating element described above and which is mounted on the furnace as shown in FIG. 1. The modulus of rupture testing device is of the center point loading type and is provided with a magazine for storing the specimens, a means for moving the specimens into position, and a means for removing the broken specimens. The testing device can be made entirely of graphite. It could also be made from tungsten or other suitable materials.

The housing 61 is generally cylindrical in configuration. The cover 62 is bolted to the housing 61 by means of bolts 63. The load is applied to specimen $W_1$ through a push rod 64 which slides up and down in the center hole of the cover 62. The push rod 64 is prevented from rotating by a set screw 65, which is mounted in the housing and which extends into a longitudinal groove 66 in the push rod 64. The specimens $W_1$ rest on the rods 67 which are seated in V grooves on the base member 68. These rods 67 are secured to the base 68 by means of pins (which are not shown). The V grooves in the base are accurately machined to provide a predetermined span between the longitudinal axis of the rods. A carriage 71 is slidable on a track cut in the base member 68. This carriage 71 is actuated by rotating an actuator extension rod 72 which transmits the motion to the carriage through arm 73 and stud 74. Stud 74 is screwed into the carriage 71. The arm 73 is secured to the actuator extension rod 72 by means of a pin (not shown). The reciprocating motion of carriage 71 is limited by a groove cut in the base on which the stud 74 moves.

The magazine for storage of the specimens is formed by a rear wall 81, a front wall 82, and two side frames 83 and 84. These sides frame 83 and 84 are provided with vertical grooves on which the front and rear walls 81 and 82 of the magazine fit. The side frames 83 and 84 are held in place by long bolts 85, 86, 87 and 88 which pass through the cover 62, the base 68 and screw into the bottom of the housing 89. The rear wall 82 is provided with an opening which just allows passage of section 91 of the carriage. The bottom piece in the stack of specimens in the magazine rests on the rods 67. In this position the bottom piece is too high to pass through the opening in the rear wall, but it can pass through a bottom opening in the front wall when pushed by vertical surface 92 of the carriage. The side cover 61 is held in place by means of pins 101. This cover 61 prevents broken specimen pieces from entering the space between the apparatus and the susceptor wall, and at the same time provides for a black-body enclosure for more acurate optical temperature measurements through a sighting hole 102 located in the cover 62. The side cover 61 can be further provided with a hole 103 through which a thermocouple tube may be inserted. The magazine is filled with the test bars either through the rear by removing the lid and rear wall or through the bottom opening in the front wall with the aid of a spatula.

The apparatus operates as follows: With the testing device installed in the furnace as shown in FIG. 1, and with the specimen in the position shown in FIG. 2, a load is applied to the specimen at midspan by the push rod which is actuated by the cross head until the specimen breaks. The motion of the cross head is reversed until it returns to its original position. As the actuator is rotated, the vertical surface of the carriage pushes the bottom test bar in the magazine through the bottom opening of the front wall. This new specimen pushes the broken specimen to the edge of the rods 67 from where it falls to the bottom of the housing. At the end of its forward travel, surface 91 of the carriage will be touching the rear wall of the magazine while the new test bar will be in its test position under the push rod and ready for breaking. While the carriage was pushing the specimen into test position, the bottom specimen in the stack dropped onto a horizontal surface of the carriage but was prevented from moving with the carriage by the front wall. When the motion of the carriage is reversed, this test bar will drop onto the rods and the apparatus is ready for a repetition of the sequence described above.

Figure 3:
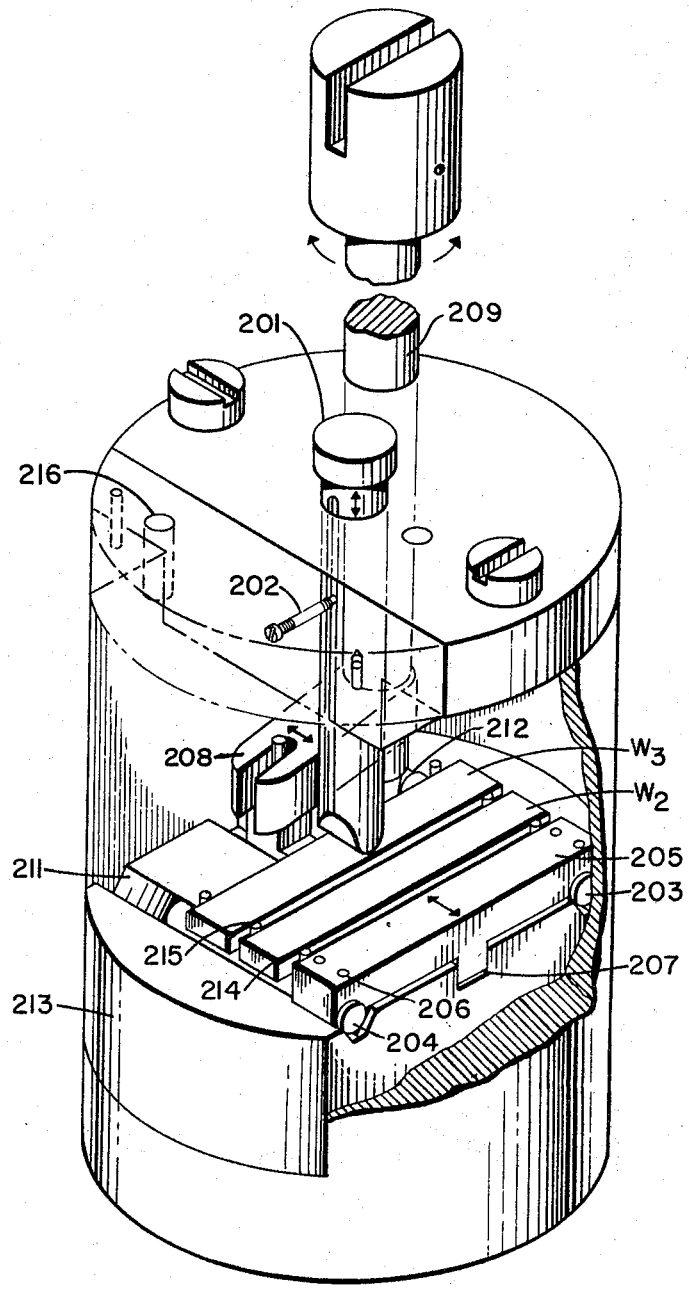
FIG. 3 is a pictorial view partly broken away and partly in section of the modulus of elasticity test portion of the apparatus.

Referring now to FIG. 3, there is shown a somewhat modified version of the test portion of the device for use in performing a modulus of elasticity test on a specimen. This testing device is mounted within the furnace in the same manner as the modulus of rupture testing device shown in FIGS. 1 and 2. This testing device is substantially similar to the testing shown in FIG. 2. This device is also preferably made entirely of graphite. The test specimens $W_2$, $W_3$ are bent by pushing at the midspan of the specimen with a push rod 201 attached to the cross head of the tensile machine through collars, rods, and couplings, in the same manner as the modulus of rupture testing device. The push rod 201 is prevented from rotating by means of a set screw 202. Either two specimens or a specimen and a standard are located on two rods 203 and 204 that are attached to the carriage 205 by means of graphite pins 206. This carriage 205 can move back and forth in a track 207 cut in the base when actuated by the arm 208 attached to the actuator extension rod 309 which, just as in the case of the modulus of rupture apparatus, can be rotated from outside the furnace so that either one or the other of the test bars are in the bending position under the push rod. The rods 203, 204, on which the test specimen bars $W_2$, $W_3$ ride, move back and forth with the carriage 205 in V grooves 211, 212 in the base 213. The test bars $W_2$, $W_3$ are separated from each other and from the carriage by means of locating pins 214 and 215. The temperature can be determined by means of a thermocouple inserted in thermocouple hole 216.

The above device can be used to determine the static elastic modulus of elasticity of materials at all temperatures within the elastic range of the material. This device differs from known prior art devices for determining the modulus of elasticity in that other devices required a plurality of three gauges in order to determine the deflection of the specimen. Another feature of this device is that the amount of deflection of the bar at the midspan can be preset by means of a set screw 208 threading into the carriage under the midspan of the test bar. In addition, either one specimen can be tested against a standard or two specimens tested at the same time. The device can also be used to determine plastic deformation of materials or creep as a function of temperature by comparing the position of the midspan with respect to that of another specimen of the same dimensions used as a reference or standard.

Obviously many modifications and variations of the present invention are possible in light of the above teachings. As for example, the test device could be made out of steel in which case the various members could be welded or riveted or fastened together by other means.

It is, therefore, to be understood that within the scope of the appended claims, the invention may be practiced otherwise than as specifically described.

What is claimed is:

1. A device for measuring the modulus of elasticity of bar specimens comprising: a generally hollow cylindrical housing, a vertically disposed inwardly extending slidable push rod mounted on said housing, said push rod having a longitudinal groove, a screw member mounted on said housing and engageable with said groove for limiting axial rotation of said push rod, a horizontally disposed base member mounted within said housing, said base member having a plurality of longitudinal disposed V-shaped grooves, a plurality of rods mounted within said grooves, a longitudinal reciprocating carriage assembly mounted on said rods, said carriage assembly including a vertically disposed stud, a vertically disposed actuator rod mounted on said housing and extending into said housing and being operatively connected to said reciprocating carriage, said actuator rod being axially rotatable for transmitting reciprocating motion to the carriage, said carriage assembly being adapted to hold at least one test specimen.

2. A device according to claim 1 wherein each of said elements is fabricated from graphite.

3. In a material testing apparatus of the type wherein a force is applied to the central portion of a test specimen supported at opposed end portions, the improvement comprising a housing, a vertically disposed inwardly extending slidable push rod mounted on said housing for engaging said central portion of said test specimen, said push rod having a longitudinal groove, a screw member mounted on said housing and engageable with said groove for limiting axial rotation of said push rod, a horizontally disposed base member in said housing having a plurality of longitudinal disposed grooves, a plurality of rods positioned in said grooves for engaging said opposed end portions of said test specimen, a longitudinal reciprocating carriage assembly within said housing having a vertically disposed stud, a vertically disposed actuator rod mounted on said housing and extending into said housing and being operatively connected to said reciprocating carriage, said actuator rod being axially rotatable for transmitting reciprocating motion to the carriage, said carriage assembly being adapted to move one specimen away from said push rod while moving another test specimen beneath said push rod.

References Cited

UNITED STATES PATENTS

| 2,404,584 | 7/1946 | Liska et al. | 73—100 X |
| 2,450,880 | 10/1948 | Chatten et al. | 73—12 |
| 2,699,862 | 1/1955 | Walter | 214—8.5 |

RICHARD C. QUEISSER, *Primary Examiner.*

J. W. MYRACLE, *Assistant Examiner.*